(12) United States Patent
Gleichauf (10) Patent No.: US 8,516,270 B2
(45) Date of Patent: Aug. 20, 2013

(54) INCREMENTAL AND BULK STORAGE SYSTEM

(75) Inventor: Paul H. Gleichauf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 290 days.

(21) Appl. No.: 12/949,726

(22) Filed: Nov. 18, 2010

(65) Prior Publication Data

US 2012/0131352 A1 May 24, 2012

(51) Int. Cl.
*H04L 29/06* (2006.01)

(52) U.S. Cl.
USPC .......................................... 713/189; 707/621

(58) Field of Classification Search
USPC .......................... 713/189; 707/610, 620, 621
See application file for complete search history.

(56) References Cited

U.S. PATENT DOCUMENTS

| | | | | |
|---|---|---|---|---|
| 6,085,323 | A * | 7/2000 | Shimizu et al. ................ | 713/150 |
| 6,862,582 | B2 * | 3/2005 | Harada et al. .................... | 705/51 |
| 6,934,877 | B2 * | 8/2005 | Tamatsu ........................ | 714/5.11 |
| 7,197,615 | B2 * | 3/2007 | Arakawa et al. ............... | 711/162 |
| 7,451,286 | B2 * | 11/2008 | Nadathur et al. .............. | 711/162 |
| 7,464,126 | B2 * | 12/2008 | Chen .............................. | 707/655 |
| 7,631,021 | B2 * | 12/2009 | Sarma et al. ........................... | 1/1 |
| 7,725,669 | B1 * | 5/2010 | Bingham et al. ............... | 711/162 |
| 7,865,678 | B2 * | 1/2011 | Arakawa et al. ............... | 711/162 |
| 8,001,344 | B2 * | 8/2011 | Uchida et al. .................. | 711/162 |
| 8,051,043 | B2 * | 11/2011 | Young ............................ | 707/646 |
| 8,108,636 | B2 * | 1/2012 | Gordon-Carroll et al. ... | 711/162 |
| 8,176,272 | B2 * | 5/2012 | Augenstein et al. .......... | 711/162 |
| 8,266,453 | B2 * | 9/2012 | Gordon-Carroll et al. ... | 713/193 |
| 2002/0023198 | A1 * | 2/2002 | Kokubun et al. .............. | 711/162 |
| 2003/0110097 | A1 * | 6/2003 | Lei .................................. | 705/27 |
| 2004/0030852 | A1 * | 2/2004 | Coombs et al. ............... | 711/162 |
| 2004/0139026 | A1 * | 7/2004 | Harada et al. .................... | 705/51 |
| 2004/0172538 | A1 * | 9/2004 | Satoh et al. .................... | 713/175 |
| 2004/0260950 | A1 * | 12/2004 | Ougi et al. ..................... | 713/201 |
| 2005/0086241 | A1 * | 4/2005 | Ram et al. ...................... | 707/100 |
| 2006/0080415 | A1 * | 4/2006 | Tu .................................. | 709/220 |
| 2006/0277598 | A1 * | 12/2006 | Ahn .................................. | 726/5 |
| 2007/0005456 | A1 * | 1/2007 | Lei .................................. | 705/27 |
| 2007/0130146 | A1 * | 6/2007 | Heinz et al. ........................ | 707/9 |
| 2007/0203938 | A1 * | 8/2007 | Prahlad et al. ................ | 707/102 |
| 2008/0126357 | A1 * | 5/2008 | Casanova et al. ............... | 707/10 |
| 2008/0148332 | A1 * | 6/2008 | Kassam et al. ................ | 725/115 |
| 2008/0176540 | A1 * | 7/2008 | Khedouri et al. ........... | 455/414.1 |
| 2008/0177860 | A1 * | 7/2008 | Khedouri et al. ............ | 709/217 |
| 2008/0212944 | A1 * | 9/2008 | Khedouri et al. ............ | 386/124 |
| 2009/0144341 | A1 * | 6/2009 | Hauck et al. .................. | 707/202 |
| 2009/0265396 | A1 * | 10/2009 | Ram et al. ...................... | 707/204 |
| 2009/0307284 | A1 * | 12/2009 | Welingkar et al. ............ | 707/204 |
| 2009/0307333 | A1 * | 12/2009 | Welingkar et al. ............ | 709/219 |
| 2010/0169590 | A1 * | 7/2010 | Gordon-Carroll et al. ... | 711/162 |
| 2010/0169668 | A1 * | 7/2010 | Gordon-Carroll et al. ... | 713/193 |

(Continued)

FOREIGN PATENT DOCUMENTS

WO WO2008137390 11/2008

*Primary Examiner* — David Garcia Cervetti
(74) *Attorney, Agent, or Firm* — Fish & Richardson P.C.

(57) ABSTRACT

A method for storing electronic data. A first set of electronic data may be copied from a computing device to a capsule. The capsule then may be transferred or located to a location other than that of the computing device. The capsule and the computing device may be in electronic communication. The first set of electronic data may be updated on the capsule when changes are made to the first set of electronic data on the computing device.

36 Claims, 6 Drawing Sheets

(56) References Cited

U.S. PATENT DOCUMENTS

2010/0293148 A1* 11/2010 Cesario et al. ................ 707/652
2011/0196840 A1* 8/2011 Barzilai et al. ................ 707/645
2012/0084333 A1* 4/2012 Huang et al. .................. 707/827

* cited by examiner

INCREMENTAL AND BULK STORAGE SYSTEM

BACKGROUND

1. Technical Field

The present invention relates generally to computer storage devices and more specifically to backup computer storage devices.

2. Background Discussion

Computers are essential devices in today's society. As computers are becoming more and more used and relied upon by individuals and businesses, electronic data stored and utilized by computers are also becoming more essential. For example, people may keep their photographs in electronic form and display them on an electronic display instead of in physical photo albums. Likewise, people and/or corporations may keep important financial data in electronic form. As electronic data has become more important, protecting against its destruction, loss and/or theft has likewise become more important.

A variety of backup systems for protecting electronic data exist. Often these backup systems are located at or near the same physical location as the original computer device creating and/or storing the data. These backup systems may only protect the data in case of a problem with the computer device (e.g., hard drive failure, virus or the like). On the other hand, because these devices are stored near the original computing device, they may be destroyed (as well as the data stored on them) in the case of a fire, earthquake or other physical/natural disaster.

SUMMARY

An example of the present embodiment may include a method for storing electronic data. A first set of data may be classified as one of a set of data types. The first set of electronic data may be copied or transferred from a computing device to a capsule. The capsule then may be relocated or transported to a location other than that of the computing device. After being transported the capsule and the computing device may be in electronic communication. The first set of electronic data may be updated on the capsule when changes are made to the first set of electronic data on the computing device.

Other embodiments of the disclosure may include a method for backing up electronic data on more than one computing device. The method may include the operations of transferring a first set of electronic data from a first computing device onto a first capsule. Transferring a second set of electronic data from a second computing device onto a second capsule. Then locating the first capsule and the second capsule at a location other than a location of the first and second computing devices, respectively. Transferring the first set of electronic data to the second capsule and transferring the second set of electronic data to the first capsule. Updating the first set of electronic data on the first and second capsules and updating the second set of electronic data on the first and second capsules.

DETAILED DESCRIPTION

I. Introduction and Overview

Described herein are various examples of an electronic data backup system. The system may include a backup capsule and a computing device. Some embodiments may employ additional capsules and/or computing devices. In one embodiment, the first capsule may be physically connected to a first computing device, for example through a cable, system bus or hard-wired connection. While connected, the first capsule may download electronic data stored on the first computing device that a user wishes to back up. The electronic data may include personal data (e.g., financial spreadsheets, banking statements, personal correspondence and other private documents), shared data (e.g., photographs, word processing documents and other electronic files that a user may share with certain designated persons or entities), licensed data (e.g., music, books, and other data purchased or otherwise legitimately obtained from a third party vendor of electronic data), and/or public data (e.g., public web sites and the like). The data may be protected such that each category of electronic data may have a different type or level of access control and/or encryption applied thereto prior to copying to the first capsule. Alternatively, all data being backed up may be encrypted with the same encryption type or level (if any) and stored on the first capsule. In embodiments having more than one capsule and/or computing device, this process is typically performed for each computing device storing data a user wishes to back up.

This initial backup typically, although not necessarily, involves the transfer of a large volume of data from the computing device to the capsule. To accommodate the large initial volume, the initial transfer is generally made across a high-speed connection such as a physical cable.

After the initial electronic data has been downloaded to the capsule(s), the capsule(s) may be sent or transported to a physical location other than that of the computing device. For example, the capsule(s) may be mailed, shipped, walked, driven or the like to a second location. This second location may be across a street, in another city or even another country. In short, the second location may be any location desired by the user. Some users may wish to transport the capsule to a secure facility that restricts or prohibits access to the capsule, for example. Other users may transport the capsule to a fireproof or fire-resistant location.

Once in this separate location, the capsule may be in electronic communication (e.g., via the Internet, an intranet, an Ethernet, a telephone line, any wired or wireless communications, and the like, all of which are encompassed by the term "network") with either the computing device and/or other capsules. At time intervals or as selected by the user, the capsule may remotely update the backup data, across the network, to reflect the current state of previously-backed up data that is stored on the computing device. This allows the capsule to contain a current version of all electronic data on the computing device, such that if the computing device becomes inaccessible, damaged or stolen most, if not all, of the data may be retrieved.

For example, a user may download a copy of data A from a personal computing device to a capsule through a direct physical connection. The copy of the data on the capsule may be referred to as "data A'." Data B, also resident on the personal computing device, may not be copied onto the capsule. The capsule may be moved to a different physical location, such as a secure network facility. There, the capsule may connect (either periodically or substantially constantly) across a network to the personal computing device. At some point after data A is changed on the personal computing device, it may be copied to the capsule, thereby updating data A' to match the current state of data A. Not all of data A need be transferred across the network to the capsule. In some embodiments, only those portions of the data that have been modified are transmitted to the capsule. Generally, if data B is changed, the changes are not transferred across the network since it is not backed up on the capsule. In this manner, a user may selectively back up data and keep it current. Likewise, in certain embodiments a user may select some data for backup but not for updating.

The capsule may communicate with other capsules to store and transmit the backup data and/or may communicate directly with the computing device(s). In one embodiment, there may be two capsules, each of which is connected to two computing devices. The first capsule may store data from the first computing device as a primary backup and data from the second computing device as a secondary backup, while the second capsule essentially reverses this. In this embodiment, the data for the computing device may be stored on the first capsule as well as the second capsule, thereby being provided with two unique backup copies (one on each capsule). Additionally, the two capsules may be configured to communicate directly with one another via a network, which may be the same or a different network than the one connecting the remote computing device to a capsule. This may allow for multiple copies of the electronic data to be stored in a number of different locations. This may be beneficial as even if one of the capsules and/or computing device fails or is destroyed, there are multiple other copies of the data. Further, this also provides for a local backup as well as a remote backup of the data.

The electronic data stored on the capsule(s) may be encrypted with a "total encryption" (that is, all the data on a capsule may be protected with the same level/type of encryption) or the electronic data may be portioned into subsets, each of which is protected with varying levels and/or types of encryption. For example, public data may be unencrypted, whereas private data may be protected by relatively secure encryption. Thus, data may be protected if the capsule is stolen, lost or the like. Further, the use of varying levels of encryption allows certain electronic data to be shared while protecting other data. For example, a user storing the capsule at a location remote from the computing device it backs up may wish to permit anyone to access any public data stored on the capsule, while restricting access to private or shared data. Also, this may allow a user to share some information with a user located near a capsule, while still protecting/restricting access to important (e.g., private or certain shared or licensed) data.

An encryption key and/or key generator may be used to encrypt the data. The use of encryption keys and key generators is generally understood by those skilled in the art. Embodiments discussed herein generally may operate with any type of known encryption.

II. Backup System

Figure 1:
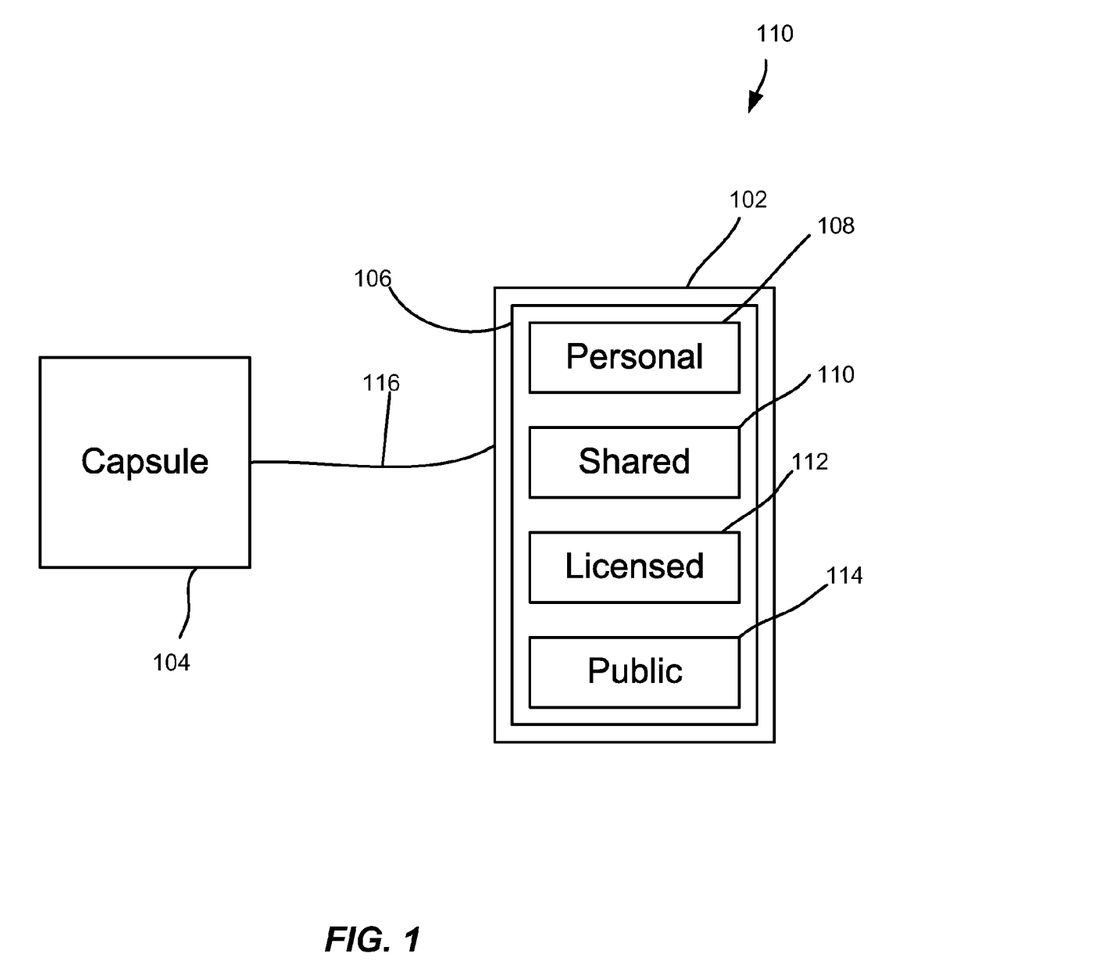
FIG. 1 is a block diagram illustrating an embodiment of a capsule in communication with a computer.

FIG. 1 illustrates an embodiment of the backup system 100. A first capsule 104 is in electronic communication with a first computing device 102 over a connection 116. The capsule 104 and the computing device 102 may be both computing devices. For example, the capsule 104 and/or the computing device 102 may be a desktop computing device, laptop computing device, portable computing device (e.g., smart phone), or any other type of computing device.

The computing device 102 may be used to create, download and/or manage a set of user data 106. The capsule 104 may store and/or manage the data 106 as it is transferred from the computing device 102 and/or stored on the capsule 104. "Managing" data may include operations such as updating previously backed-up data with newly received versions of that data. Managing data may also include adding new data to a backup copy, deleting data from the backup copy that a user no longer wishes to duplicate, and the like.

Figure 2:
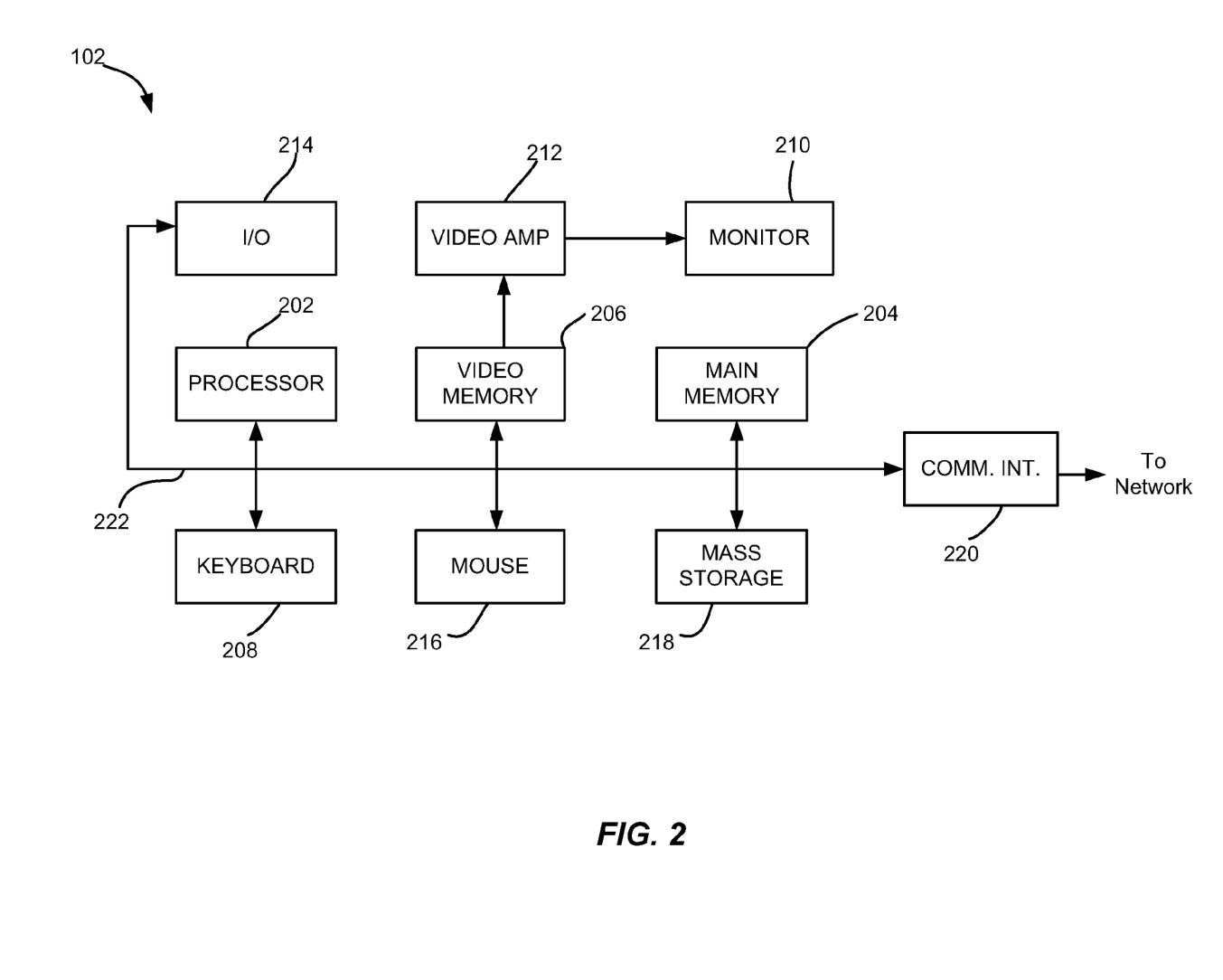
FIG. 2 is a block diagram illustrating an embodiment of a computing device.

FIG. 2 illustrates an embodiment of a sample computing device 102 capable of storing and/or processing data, which is typically stored in one or more electronic files on a tangible storage medium. In some embodiments, the computing device 102 may be a personal computing device, such as a laptop computer, tablet computing device, mobile telephone, personal digital assistant and the like. In other embodiments, the computing device 102 may be a desktop computer, server, and the like. It should be appreciated that the sample computing device 102 is illustrative only. Certain embodiments may operate with or employ computing devices that may lack one or more elements shown in FIG. 2, or that have additional elements not shown. For example, if the computing device is a tablet computer, it may include a touch-sensitive display screen but may omit the keyboard 208 and/or mouse 216.

With the foregoing in mind, the computing device 102 of FIG. 2 may now be described. A keyboard 208 and mouse 216 may be coupled to the computing device 102 via a system bus 222. The keyboard 208 and the mouse 216, in one example, may introduce user input to the computing device 102 and communicate that user input to a processor 202. Other suitable input devices may be used in addition to, or in place of, the mouse 216 and the keyboard 208. For example, in embodiments where the computing device 102 is a handheld electronic device, the input device may be a capacitive touch screen. An input/output unit 214 (I/O) coupled to the system bus 222 represents such I/O elements as a printer, audio/video (NV) I/O, and the like. Additionally, in some implementations, the capsule 104 may be coupled to the system bus 222 via the input/output unit 214.

Computing device 102 also may include a video memory 206, a main memory 204 and a mass storage 218, all coupled to the system bus 222 along with the keyboard 208, the mouse 216 and the processor 202. The mass storage 218 may include both fixed and removable media, such as magnetic, optical or magnetic optical storage systems and any other available mass storage technology. The bus 222 may contain, for example, address lines for addressing the video memory 206 or the main memory 204.

The system bus 222 also may include a data bus for transferring data between and among the components, such as the processor 202, the main memory 204, the video memory 206 and the mass storage 218. The video memory 206 may be a dual-ported video random access memory. One port of the video memory 206, in one example, is coupled to a video amplifier 212, which is used to drive a monitor 210. The monitor 210 may be any type of monitor suitable for displaying graphic images, such as a cathode ray tube monitor (CRT), flat panel, plasma, or liquid crystal display (LCD) monitor or any other suitable data presentation device.

The computing device 102 includes a processor 202, which may be any suitable microprocessor or microcomputing device. The computing device 102 also may include a communication interface 220 coupled to the bus 222. The communication interface 220 provides a two-way data communication coupling via a network link. For example, the communication interface 220 may be a satellite link, a local area network (LAN) card, a cable modem, and/or wireless interface. In any such implementation, the communication interface 220 sends and receives electrical, electromagnetic or optical signals that carry digital data streams representing various types of information, such as seismic signals that have been separated from a blended signal and/or blended signals.

Code received by the computing device 102 may be executed by the processor 202 as the code is received, and/or stored in the tangible mass storage 218 or other non-volatile storage for later execution. In this manner, the computing device 102 may obtain program code in a variety of forms. Program code may be embodied in any form of computing device program product such as a medium configured to store or transport computing device readable code or data, or in which computing device readable code or data may be embedded. Examples of computing device program products include CD-ROM discs, ROM cards, floppy disks, magnetic tapes, computing device hard drives, servers on a network, and solid state memory devices.

Referring again to FIG. 1, regardless of the exact configuration, the computing device 102 may be used to create, manage and store user data 106. The user data 106 may take the form of electronic files, as well as any other possible types of electronic data. For instance, data may come in the form of audio files (e.g., MP3 files, WAV files, AAC files and the like), graphics files (such as JPEG, TIFF, BMP files and so on), video files (including M4A files, Quicktime files and the like) user document files (e.g., word processing documents, spreadsheets, presentations and so forth), and so on. A user, for example, may use the computing device 102 to create data 106 such as text documents, spreadsheets or the like. Alternatively, data 106 may also be uploaded to the computing device 102, for example, from an external device such as a digital camera, smart phone or the like. Further, the data 106 may be downloaded to the computing device 102. For example, data 106 may be downloaded from websites, electronic mail attachments, network servers and so on.

Still with respect to FIG. 1, in one embodiment, the capsule 104 may be a storage device having a solid-state, hard disk, magnetic and/or other type of electronic data storage. Additionally, in some embodiments, the capsule 104 may include communication ports to connect to the computing device 102, a network, or other communication system. For example, the capsule 104 may include a universal serial bus (USB) port, Ethernet port, wireless port or the like. This allows the capsule 104 to communicate across a network with the computing device 102, other capsules and other computing devices as necessary or desired. In certain embodiments, the capsule 104 may incorporate a computing device or otherwise include hardware elements beyond simply a tangible storage medium 278. Examples of such hardware include, but are not limited to, memory 204, system bus 222, processor 202 and/or communication interface 220. It should be appreciated that in many embodiments the capsule 104 may not need to include all or any of the elements illustrated in FIG. 2. This is especially true when the capsule operates only to store data and does not need to make any decisions regarding updating stored data or creating new data. In other embodiments, the capsule 104 may also be used to create data 106 and thus may be more similar to the computing device 102.

The capsule 104 may include a display screen, such as a liquid crystal display or the like. However, in other embodiments, the capsule 104 may be configured to provide a user interface via the computing device 102. For example, the capsule 104 may communicate to the computing device 102 via the connection 116. In this configuration the capsule 104 may include software that runs and/or displays on the monitor 210 coupled to the computing device 102. In other embodiments, the capsule 104 may automatically download and update the data 106 from the computing device 102 to the capsule 104 without user interaction. In these embodiments a user interface may not be required.

The capsule 104 may be connected to the computing device 102 over a connection 116. Connection 116 may be a physical connection (such as a USB cord) or may be a wireless connection (e.g., network). In some embodiments, a physical connection may permit faster data transfer speeds to an initial backup procedure. For example, for the initial data backup between the capsule 104 and the computing device 102 may include a significant amount of data to be transferred. A hardwired connection may reduce a total time necessary to initially back up data from the computing device 102 to the capsule 104. Additionally, some Internet or network providers may charge a fee for data transfers over a certain limit, and/or may impose bandwidth consumption caps to limit the number of bits that can be consumed without additional fees or the like. In such an event, a physical connected between the computing device and capsule may avoid these charges. It should nonetheless be appreciated that, in other embodiments, the initial data transfer between the computing device 102 and the capsule 104 may occur over a wireless connection.

III. User Data

User data 106 may generally be classified into different categories, such as personal data 108, shared data 110, licensed data 112 and public data 114. These classifications may vary from embodiment to embodiment, as may the data or type of data included in each such classification. Accordingly, the following should be understood as an example of data classifications. It should also be appreciated that data may be assigned to one or more of the following groups either by a user or other entity, or through operations of the computing device 102 (or, in some embodiments, operations of the capsule). The computing device and/or capsule may assign data to a particular class based on a variety of factors, such as user-specified rules, file extensions and/or file types, the date and/or time at which the data was created or obtained, the manner in which the data was created or obtained (such as through the operation of a specific application), the source of the data, and so on.

Personal data 108 typically is data that a user wishes to keep private (e.g., for his eyes only). It may include data such as tax records, banking information or other important data important to the user. Typically, personal data is encrypted and may be decrypted through use of a key, as described in more detail below and particularly with respect to FIG. 5. Personal data generally has the highest level of protection, although in some embodiments this may not be the case.

Shared data 110 is typically data that may be accessed by a particular group of people but not by persons outside the group. Access may be administered through a particular password scheme, for example. Only those knowing the password may be granted access. Other group access control schemes exist and may be employed by other embodiments. Examples of shared data include photographs, videos, mass emails, and the like.

Licensed data 112 may include electronic books, music, movies and other data purchased and/or licensed from a content provider. Typically, licensed data is sold or given to a user from an entity authorized to provide the data. Examples of authorized entities include Apple's iTunes store, Amazon.com, Barnes & Noble's BN.com website and the like. Generally, licensed data may not be backed up on a capsule 104 by embodiments discussed herein. Instead, purchase information for the licensed data or other identifying information may be stored on the capsule, optionally along with a reference link to the third party provider from whom the licensed data was obtained. In this manner, a user may follow the reference link and provide the identifying information to the third party provider in order to re-obtain a copy of the licensed data. This may preserve the storage capability of the capsule 104 for personal and/or shared data, for example.

Finally, public data 114 may include data 106 the user provides to almost any user and/or data that is readily available over a network or the like. For public data that is freely available at a public site, such as a Web page, FTP portal and the like, a reference link to the location of such data may be stored instead of the data itself. During a restore operation from the capsule, the reference link may be provided to the computing device to facilitate the computing device obtaining a fresh copy of the public data from the public site.

The various classifications of data 106 may be protected with different types and/or levels of security, whether on the computing device 102 or when stored on the capsule. For instance, public data 114 may be accessible to any anyone who can access the capsule and/or network to which the capsule is connected. By contrast, personal data 108 may be encrypted so that only specific users, software programs and/or devices may access such data. Also, different layers, types and/or strengths of protection or security may be used for each different classification of data 106. For example, personal data 108 may be encrypted, shared data 110 may be access controlled but not encrypted, while public data is neither password protected nor encrypted.

IV. Data Backup and Storage

Figure 3:
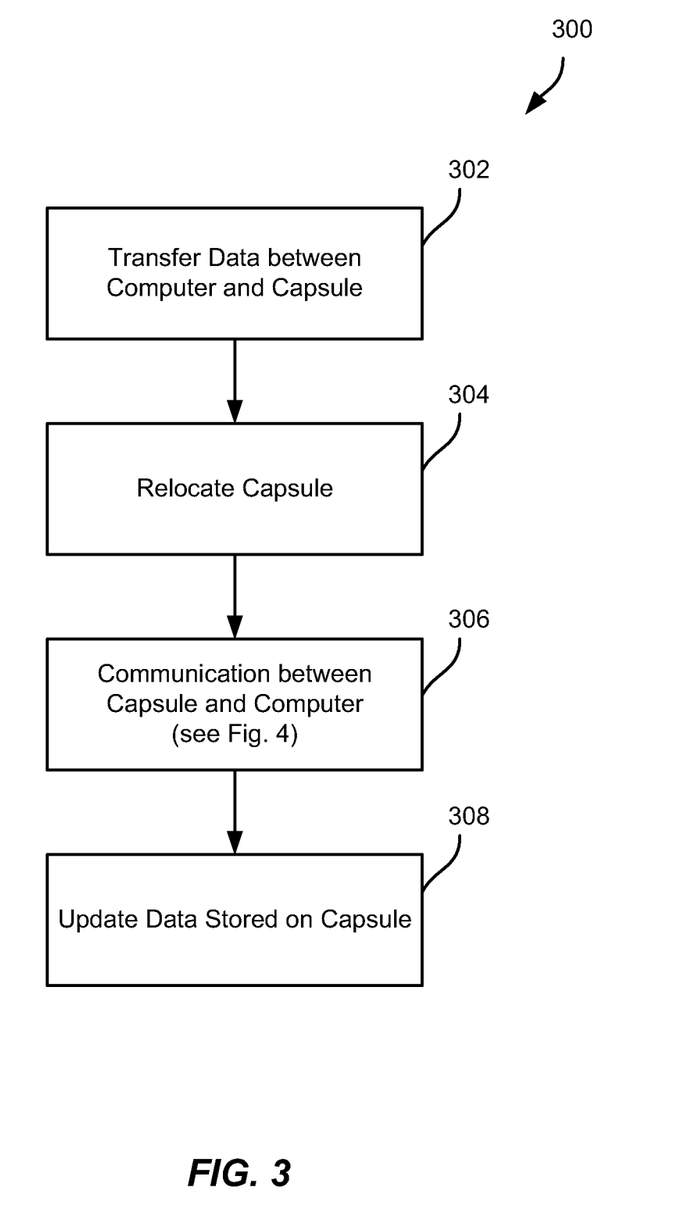
FIG. 3 is a flow diagram illustrating a sample method for backing up data from a computing device onto a capsule.

FIG. 3 illustrates an embodiment for creating a backup of the data 106. Operations 300 may begin with operation 302, in which the data 106 may be transferred between the computing device 102 and the capsule 104. Typically, this occurs when the capsule 104 and computing device 102 are in the same physical location and locally connected to one another. Next, in operation 304 the capsule 104 is physically moved to another location. As discussed above, this location may be substantially close the computing device 102 or far away. After the capsule 104 has been transported, in operation 306 a connection between the capsule 104 and the computing device 102 is created. Typically, this electronic connection occurs across a network and is not a direct physical link between the two, such as a USB cable. The connection allows communication between the capsule 104 and the computing device 102. It should be noted that in some embodiments, operation 306 may be between capsules 104, 124. Next, In operation 308, data 106 is updated on the capsule 104 as it is updated on the computing device (or at some point thereafter, such as regular intervals). Operation 308 thus facilitates storing a current copy of the data 106 on the capsule 104. Accordingly, additions, modifications and the like may be backed up as well as the original set of data 106.

Figure 4:
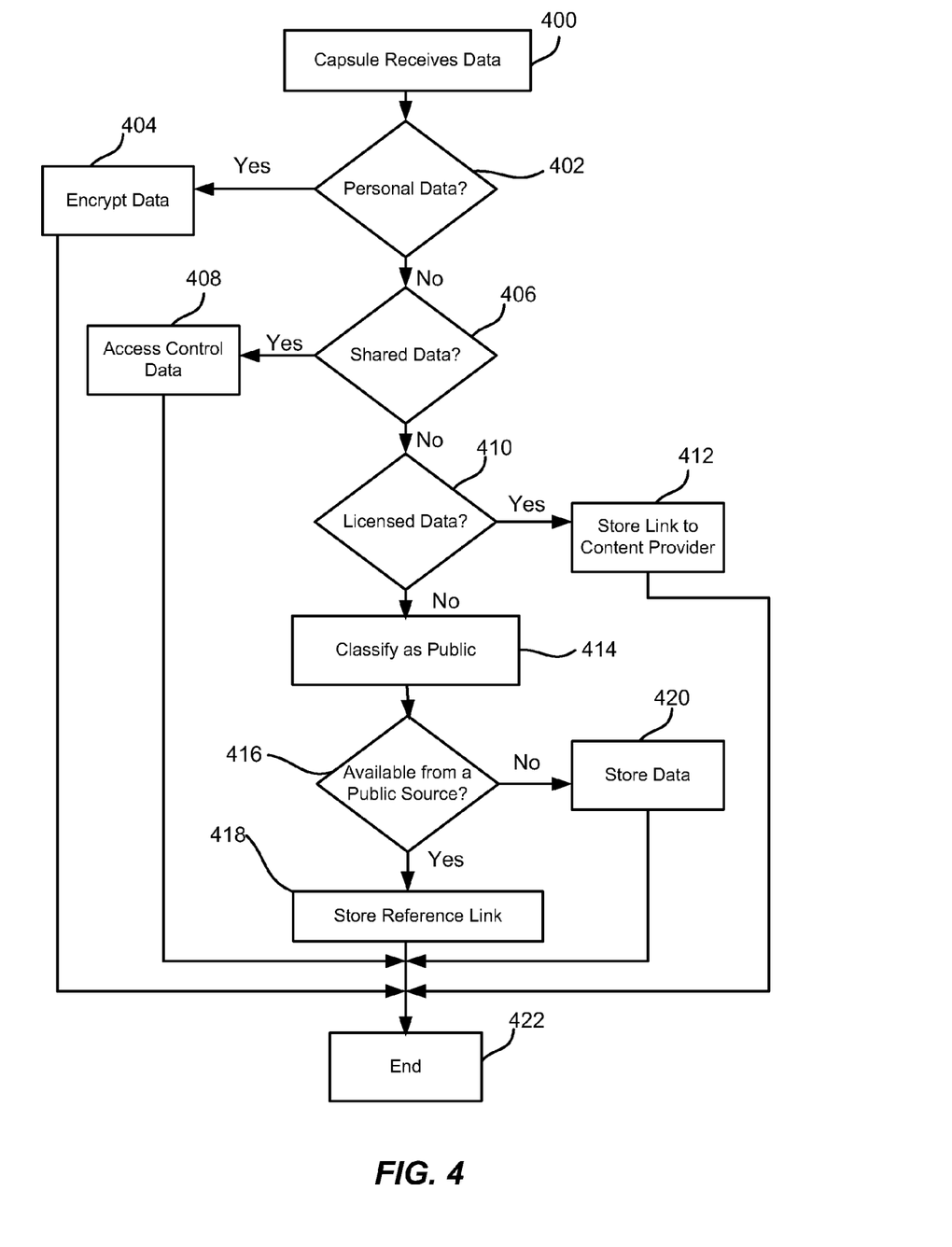
FIG. 4 is a flow diagram illustrating a sample method for classifying and copying data that may occur during operation 306 of FIG. 3.

FIG. 4 is a flowchart depicting certain operations that may be executed as part of operation 306 of FIG. 3. In operation 400, the capsule receives data to be backed up from the computing device. Next, in operation 402, the embodiment determines if the data is personal data. This determination, along with others described with respect to FIG. 4, may be performed by either the computing device 102 or capsule 102, depending on the configuration and capabilities of both. In the event the data is personal data, operation 404 is executed and the personal data is encrypted. Next, the method of FIG. 4 terminates in end state 422. Following end state 422, operation 308 of FIG. 3 may be executed.

If the embodiment determines in operation 402 that the data is not personal, then operation 406 is executed and the embodiment determines if the data is shared data. If so, in operation 408 the embodiment may protect the shared data with a shared group key. Following operation 408, end state 422 is accessed.

If the data is not shared data, then, from operation 406, operation 410 is executed. In this operation, the embodiment determines if the data is licensed. If so, operation 412 is executed and a reference link to a third party location of the licensed data is stored in lieu of the licensed data. Reference links are discussed in more detail below. Data used to prove ownership of licensed data, such as transaction information or other credentials, may also be stored. In some embodiments, such ownership data may be treated as private data, with the appropriate associated backup and protection scheme. After operation 412, end state 422 is achieved.

In the event that the embodiment determines the data is not licensed data, then operation 414 is accessed. In this operation, the data is classified as public data since it is not personal data, saved data or licensed data. In some embodiments, a geographic location of the capsule may be used to determine if certain data is public or not. This geographic determination may be updated as the capsule moves and is attached to a network or otherwise made aware of its location. Such a determination is useful, for example, in situations where the capsule crosses national boundaries since the acceptability and/or definition of "public data" may vary from country to country. This geographic determination may be made either by a processor within the capsule, may be performed by a computing device to which the capsule is connected, or by the computing device being backed up by the capsule. In the latter scenario, the determination may be made every time the computing device pushes data to the capsule. Prior to such pushes, the capsule may report its location to the computing device and the computing device may reclassify data as necessary. The report of the capsule's location may take the form of GPS coordinates and the like, or may be as simple as an IP address assigned to the capsule by a network.

Next, in operation 416, the embodiment determines if the public data in question may be retrieved from a third party public source. The embodiment may make this determination in a number of ways, such as looking at a file extension of the public data or otherwise determine a type of the data, applying a set of user-created rules, following a link associated with the public data to see if the link leads to a freely accessible Web site, FTP site, file storage, or other freely accessible site, and so on.

If the public data is available from a third party public source, operation 418 is accessed. In operation 418, a reference link to the external location of the licensed data is stored on the capsule 104. Then end state 422 is entered. However, if the public data is not available from a public source, the embodiment executes operation 420 and stores the public data on the capsule. Following operation 420, end state 422 is executed.

Discussion of Initial Backup

Briefly returning to FIG. 1, when the capsule 104 is connected via a connection 116 to the computing device 102, data 106 may be transferred to storage within the capsule 104. As discussed above, this storage may be a hard drive, solid state, magnetic disk or any other type of electronic storage. The data 106 may be transferred and stored on the capsule 104 such that it retains its security level, encryption or the like. For example, the personal data 110 may remain encrypted on the capsule 104, while the public data 114 may remain un-encrypted. These embodiments help to ensure that if the capsule 104 is stolen, hacked or otherwise accessed, the data 106 desired by the user may remain secure.

In some embodiments, after the data 106 from the computing device 102 has been transferred to the capsule 104, the connection 116 (if hardwired) may be removed. The capsule 104 may then be relocated, moved or transferred to another physical location. This located may be next door, across the state, country or world from the computing device 102. The capsule 104 may be transferred/relocated via foot, car, mail, shipment, airplane or the like. Therefore, the capsule 104 may be in a different physical location from the computing device 102. This may help to prevent the data 106 from being destroyed if, for example, there is a physical disaster in the physical location of the computing device 102, e.g., a fire, tornado, hurricane, or the like. In other embodiments, the capsule 104 may remain in the same or near the same physical location as the computing device 102.

Discussion of Subsequent Backups and Updates

After the initial data transfer, the capsule 104 may be updated to include a current version of the data 106 as described above with respect to FIGS. 3 and 4. The updates/additional data transfers (e.g., data transfers other than the initial transfer) may be performed via a wireless connection or across a wired network.

How data 106 is either initially or subsequently stored on, protected on, and/or transferred to the capsule 104 may vary based on the data classification. Data transfer and storage may occur automatically for certain classifications of data, or may occur only when data is selected by a user. Similarly, some data in certain classifications may not be stored on the capsule 104 even if selected for backup by a user. In such embodiments, reference pointers or links to copies of data stored by third parties may be provided as described in more detail below.

For example, personal data 108 may be copied from the computing device 102 to the capsule 104 and stored as a backup. Access to the backup personal data 108 may be restricted with an access control (e.g., password protected) or by encrypting the data. By contrast, certain types of public data may not be backed up on the capsule 104 at all. Public data 114 that is easily accessible from a third party, such as public Web pages, may be omitted from backup operations. Instead, a reference link to the webpage may be stored on the capsule 104 in lieu of an actual backup copy. When a user restores data to the computing device 102 or another device from the capsule 104, software either executed by the capsule or the device may retrieve the reference link, follow it, and download a copy of the public data 114 to the device. In this fashion, storage space on the capsule may be preserved for more important data, or data that cannot easily be replaced from a public source. It should be noted that alternative embodiments may store copies of public data 114 instead of employing links. This may be useful when storage capacity is not an issue, backup speed is important or a user explicitly instructs an embodiment to back up public data. Further, a copy of the webpage may be stored as a duplicate copy on the capsule 104 either in addition to or in place of the reference.

Similarly, licensed data 112 may either be stored as a duplicate copy, a reference or a combination of copies and references on the capsule 104. Licensed data 112 that may be re-obtained from the third party provide may not be stored on the capsule itself. Instead, the capsule may store a reference link, and any identifying information that facilitates obtaining a fresh copy of the licensed data. The identifying information may be metadata such as a license or transaction number, user information or the like. In other words, the capsule 104 may only include the song title, reference number, a transaction number, customer number or another piece of data to prove ownership. Further, some license content providers may provide an automatic backup service for users who have the metadata or other reference data for the licensed content. Then, if the original data 106 on the computing device 102 is destroyed, the user can use the reference data to re-download the licensed data 112 from the provider (either over a network or hardwired connection). This may be beneficial as licensed data 112 such as music, movies, and the like may require a significant amount of storage space for backup. Some embodiments may maintain one full copy of the licensed data 112 on the computing device 102, while a reference link and identifying information associated with the data 112 may be stored on the capsule.

In some embodiments, the user may decide whether to duplicate licensed and/or public data or, instead, store a reference link to the data 106. For example, for licensed data 112 the user may decide whether the store a duplicate copy or reference of each file. This may depend on how fast a user may wish to retrieve data if the computing device 102 crashes (or the data 106 is otherwise retrieved from the capsule 104). If a duplicate copy of the data 106 is stored on the capsule 104 it may be retrieved faster than if a reference link and identifying information is stored. If only the reference link is stored, the user typically must go through the content provider to receive a copy of the data 106, thus adding complexity and time to any data restoration process. Accordingly, some users may wish to always store a duplicate copy of the data 106, whereas others with large libraries of data may wish to only store a reference to the data 106. It should be noted that although storing a duplicate copy or reference is discussed with respect to licensed data 112, this is for explanatory purposes only. Any of the types of data 106 may be stored in a similar manner. For example, personal data 108 may include reference data for a bank statement or the like.

V. Multiple Backups on a Single Capsule

Referring now to FIG. 3, in some embodiments, the capsule 104 may act as a backup for more than a single set of data 106. For example, the data 106 from the computing device 102 may be transferred to the capsule 104 in a first partition. The capsule 104 may then be shipped to another location. At the second location, a second set of data 136 may be transferred to a second partition in the capsule 104. The two partitions may be physically and/or electronically separated from each other. Additionally, as discussed above, each set of data 106, 136 may maintain its security structure and/or level when stored on the capsule 104.

VI. Distributed Backups

Figure 5:
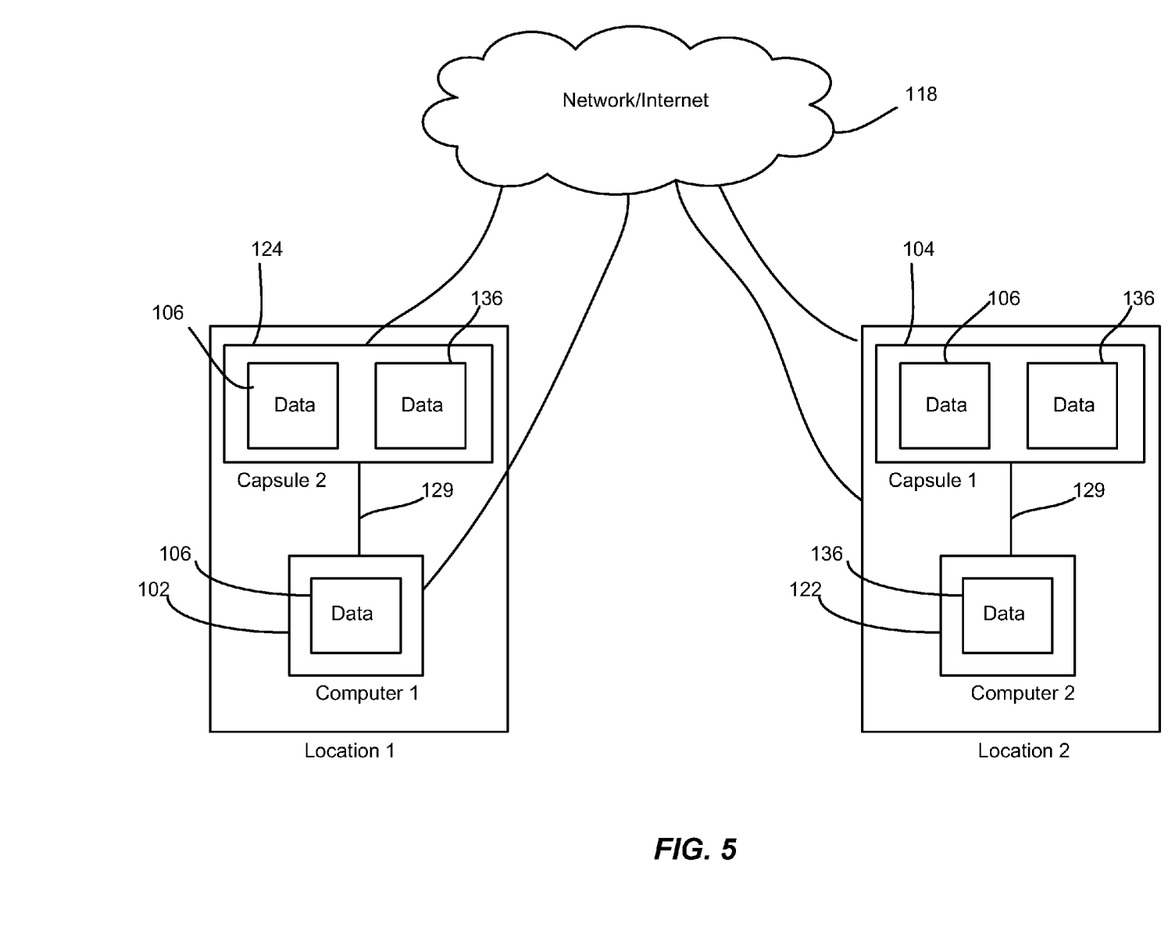
FIG. 5 is a block diagram illustrating a first and second capsule backing up a first and second computer in communication over a network.

Turning now to FIG. 5, two capsules 104, 124 may each be coupled to or otherwise in communication with a unique computing device 102, 122. Although a direct connection 129 is shown, the two capsules 104, 124 and/or the two computing devices 102, 122 may also be electronically connected to each other via the network 118. The first capsule 104 may store data 106 from the first computing device 102 in the manner previously discussed. Further, the capsule 104 may be electronically coupled to the second computing device 122 and receive and store data therefrom. This second set of data 136 may be separately stored on the capsule. In some embodiments, users and/or computing devices may be required to provide a password or other authentication to determine which set of data they may access when interacting with the capsule.

The second set of data 136 may include similar classifications of data as the first set of data 106. For example, the second set of data 136 may include personal data 138, shared data 140, licensed data 142 and/or public data 144. Also, as discussed above with respect to the first capsule 104, the second set of data 136 may be backed up as duplicate copies, reference links and/or a combination thereof.

The second set of data 136 also may be partitioned or otherwise separated from the first set of data 106. This may be beneficial as the first set of data 106 may belong to a first user and the second set of data 136 may belong to a second user. Similarly, the second capsule 124 may include a copy of both the second set of data 136 and the first set of data, each of which may be transferred from the relevant computing device via a wireless, hardwired or other connection. As with the first capsule 104, the second capsule 124 may partition or otherwise separate the two sets of data 106, 136. Thus, both capsules 104, 124 may store copies of both sets of data 106, 136.

Further, both sets of data 106, 135 may be encrypted either fully or partially. Encryption or other security mechanisms may be desired as the capsules 104, 124 may be located such that other users may have physical or electronic assess to them. Thus, the security measures may prevent the data 106, 136 (or portions of the data 106, 136) from being accessed by users who cannot supply the proper permissions/access rights.

After the original data transfer between the computing devices 102, 122 and the respective capsules 104, 124, the capsules 104, 124 may be relocated away from the first and second computing device 102, 122, respectively. In other words, after the first capsule 104 has received the first set of data 106 from the first computing device 102 it may be relocated in another physical location from the computing device 102. Similarly, after the second capsule 124 has received the second set of data 136 from the second computing device 122 it may be relocated, transferred or the like.

In this embodiment, the first capsule 104 may then be relocated physically near the second computing device 122 and the second capsule 124 may be relocated physically near the first computing device 102. As such, the first capsule 104 may also act as a local (i.e., physically close) backup for the second set of data 136. Similarly, the second capsule 124 may be a local backup for the first set of data 106. This is because the first capsule 104 already has the first set of data 106 stored and may also store data from the second computing device 124. Thus, for each set of data 106, 136 there may be two separate backup copies, one on the first capsule 104 and one on the second capsule 106.

Figure 6:
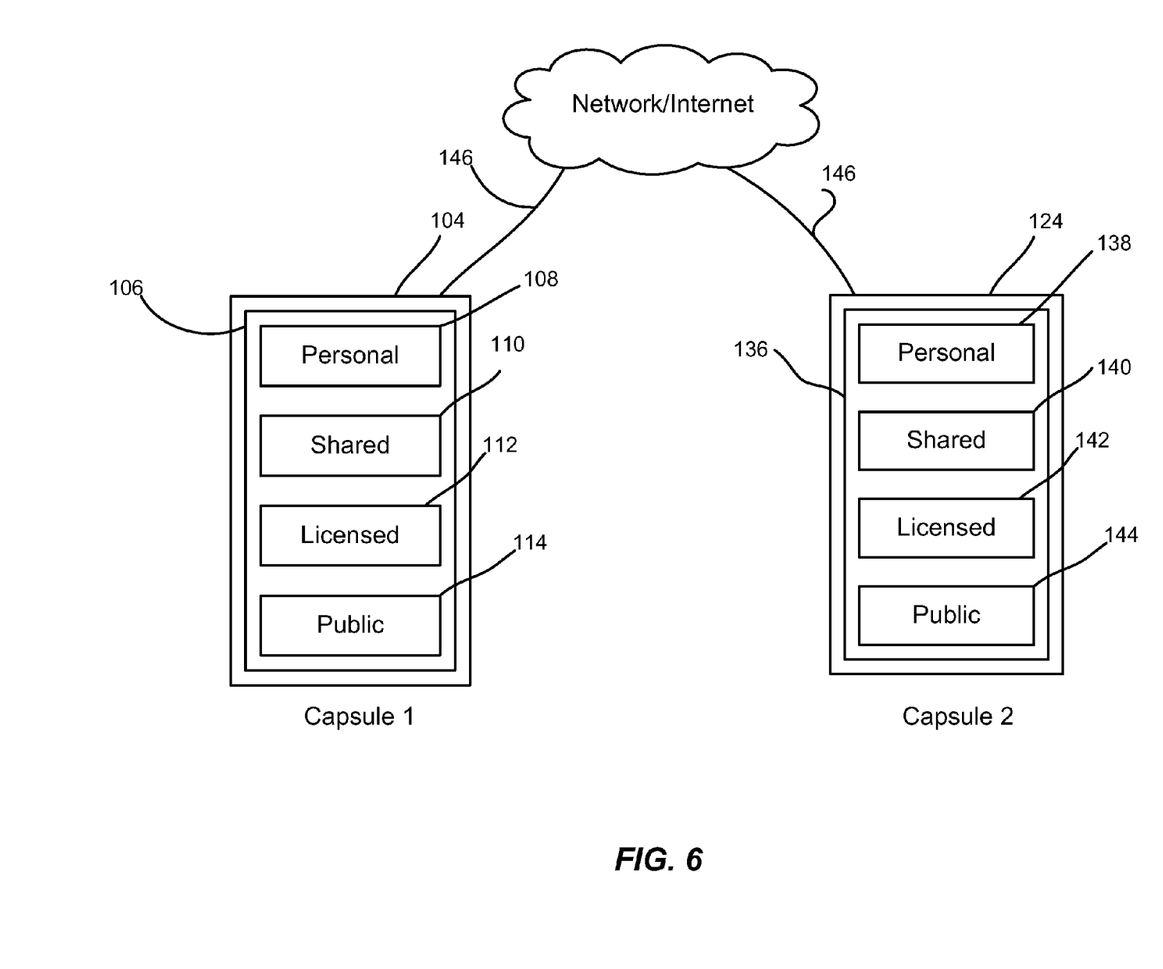
FIG. 6 is a block diagram illustrating the first capsule of FIG. 5 in communication with the second capsule of FIG. 5.

Referring now to FIGS. 5 and 6, in this embodiment, the first capsule 104 may communicate with the second capsule 106 to maintain a substantially current first set of data 106. For example, as the second capsule 124 may be connected via connection 129 to the first computing device 102, the second capsule 124 may update the first set of data 106 based on modifications, changes, additions and/or deletions done on the computing device 102. In other words, incrementally update the data 106 as it changes over time. Then, the first capsule 104 and the second capsule 124 may be connected via the network 118 or other connection and may transfer data via the network 118. Thus, as the data 106 changes on the first computing device 102, the changes are reflected on the second capsule 124.

Changes/updates in the first set of data 106 are transferred from the second capsule 124 to the first capsule 104. This may be done via the network 118, a direct connection 142 or other connection. Accordingly, the first capsule 104 may thus store a current version of the first set of data 106. It should be appreciated that the version is "current" as of the date and time of the most recent transfer/communication with the second capsule 124. In some implementations, the communication between the first capsule 104 and the second capsule 124 may be set to a predetermined frequency, e.g., once a week, once a day, once a minute, or the like. Additionally or alternatively, a user may select the update and/or communication frequency.

The second set of data 136 may be updated on the second capsule 124 in the same manner. In this embodiment, the capsules 104, 124 may function as peers. In that each capsule 104, 124 may perform symmetric services for the other. That is, each capsule 104, 124 stores data for the other capsule 104, 124. This embodiment may be beneficial as a user of each capsule 104, 124 may receive the same service as it provides to another user, that is a backup of data 106, 136.

In a second embodiment, the first capsule 104 may communicate via the network 118 to the first computing device 102. In this embodiment, the capsule 104 may update the first set of data 106 based on additions, deletions, modifications the like to the data 106 done on the computing device 102. In this embodiment, the second capsule 124 may be omitted.

VII. Master/Slave Capsules

In another embodiment, one of the capsules 104, 124 may act as a slave to the other capsule 104, 124. In this embodiment, the second capsule 124 may store a copy of the first data 106, but the first capsule 104 may not store the second set of data 136. Thus, the second capsule 124 may only operate to serve the backup needs of the first capsule 104. In this embodiment, the second capsule 124 may not need to include a partition, as it may only include the first set of data 106. This embodiment may be desired if the first set of data 106 is quite large and/or if the second capsule 124 does not have a significant amount of storage space. It should also be noted that in this embodiment, one of the capsules 104, 124 may be omitted. For example, if the first capsule 104 is omitted, the second capsule 124 may be in communication with the second computing device 122, and the second capsule 124 may act as a slave to the computing device 122. In this embodiment, the host (e.g., location provider) of the second capsule 124 may charge a fee or the like for the backup services/storage.

In other embodiments, the first set of data 106 may be divided between the two capsules 104, 124. In this embodiment, the licensed data 112 and the public data 114 may be stored on the first capsule 104 and the personal data 108 and the shared data 110 may be stored on the second capsule 124. Thus, the entire data 106 may be stored in different locations. This may be beneficial, as the storage capacity for each of the capsules 104, 124 may be reduced. Further, some data 106 may be kept easily accessible (i.e., close location) whereas other data 106 may be more secure from natural disasters and located farther away.

VIII. Encryption

As discussed above, the data 106, 136 may be encrypted and/or access to the data 106, 136 may be controlled. In embodiments where the data 106 (or portions of the data 106) are encrypted, there may be a key or other decryption tool required in order to access the data. The key may be a master key that may be tied to a thumb drive, optical drive or other security device for granting access based on physical traits of the user. In other embodiments, the key may be tied to a user's password (e.g., memorable security). In embodiments where the key is a master key, the key may provide access to all encrypted data 106 (e.g., personal data 108, shared data 110 and licensed data 112). The access key may be regenerated, if necessary. For example, it may be desired to have the key change either automatically or on demand. This may help prevent the key from being determined by someone attempting to gain access to the data 106 on the capsule 104.

It should be appreciated that keys associated with encryption and/or access control, as well as any methods or data used to access information stored on the capsule and protected by some mechanism, may be considered "content metadata." Content metadata may be considered private data by embodiments discussed herein, and thus may be encrypted and stored on the capsule to facilitate later data recovery and restoration. In some embodiments, content metadata may be considered the pinnacle of the backup hierarchy discussed herein and thus may be even more strictly protected than private data. Generally, content metadata represents a relatively small volume of data, especially when compared to the volume of data protected by the content metadata.

In some embodiments, each capsule 104, 124 may be given an identity. This identity may be cryptographically or otherwise protected. The identity may allow the capsules 104, 124 to securely authenticate each other prior to authorizing/completing a data transfer/update. For example, prior to updating the first set of data 106 on the first capsule 104 the second capsule 124 and/or computing device 102 may use the identity or other information to verify the capsule 104. However, other methods/devices for security, encryption and authorizing data access may be used. The ones discussed herein are simply optional embodiments.

IX. Conclusion

One skilled in the art will understand that the following description has broad application. For example, while embodiments disclosed herein may focus on utilizing two backup capsules, it should be appreciated that the concepts disclosed herein equally apply to multiple capsules. Furthermore, while embodiments disclosed herein may focus on backing up varieties of data, the concepts disclosed herein may equally apply to other applications, such as backing up a single type of data. Also, for the sake of discussion, the embodiments disclosed herein may tend to focus on the Internet, however, these concepts apply to other electronic communication methods/devices. Accordingly, the discussion of any embodiment is meant only to be exemplary and is not intended to suggest that the scope of the disclosure, including the claims, is limited to these embodiments.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for storing electronic data, comprising:
classifying a first set of electronic data stored in a first computing device as one of a set of data types;
performing an initial copy, at a first location, of the first set of electronic data from the first computing device to a first portable device when the first computing device and first portable device are in geographic proximity and physically connected;
determining that at least a portion of the first set of electronic data stored in the first computing device has changed, thereby resulting in a changed data set;
creating at least one update based on the at least a portion of the first set of electronic data that has changed; and
performing an incremental copy of the first set of electronic data by transmitting via a network connection the at least one update from the first computing device to the first portable device when the first portable device is in a second location that is geographically remote from the first computing device.

2. The method of claim 1, comprising:
partitioning the first portable device into a first portion and a second portion; and
transferring a second set of electronic data to the first portable device, wherein the first set of electronic data is stored in the first portion and a second set of electronic data is stored in the second portion, the second set of electronic data transferred from a second computing device.

3. The method of claim 2, comprising updating a copy of the second set of electronic data on the first portable device in response to changes to the second set of electronic data at the second computing device.

4. The method of claim 1, wherein the first set of electronic data comprises:
first data to be access controlled for storage on the first portable device;
second data to be encrypted for storage on the first portable device; and
third data that initiates storage of a reference link to a content provider of the third data; wherein
the third data is not stored on the first portable device.

5. The method of claim 4, comprising storing, on the first portable device, ownership information relating to the third data.

6. The method of claim 5, wherein the ownership information is classified and stored as first data.

7. The method of claim 1, wherein performing the initial copy of the first set of electronic data to the first portable device is done via a physical connection between the first computing device and the first portable device.

8. The method of claim 7, wherein performing the incremental copy of the first set of electronic data on the first portable device is done via a wireless network connection between the first computing device and the first portable device.

9. A method for backing up electronic data on more than one computing device comprising:
performing an initial copy of a first set of electronic data, which is stored in a first computing device, from the first computing device to a first capsule that is configured for storing backup copy of electronic data;
performing an initial copy of a second set of electronic data, which is stored in a second computing device distinct from the first computing device, from the second computing device to a second capsule that is configured for storing backup copy of electronic data;
locating the first capsule and the second capsule at a location that is geographically remote from a location of the first and second computing devices, respectively;
transferring the first set of electronic data from the first computing device to the second capsule;

transferring the second set of electronic data from the second computing device to the first capsule;

updating the first set of electronic data on the first and second capsules by performing an incremental copy of the first set of electronic data on the first and second capsules; and updating the second set of electronic data on the first and second capsules by performing an incremental copy of the second set of electronic data on the first and second capsules.

10. The method of claim 9, wherein the incremental copy of the first set of electronic data is performed on the first capsule via a network connection between the first computing device and the first capsule, and performed on the second capsule via a physical connection between the first computing device and the second capsule.

11. The method of claim 10, wherein the first capsule and the second capsule are in network communication with one another.

12. The method of claim 11, wherein updating the first set of electronic data on the first and second capsules comprise:

performing an incremental copy of an update associated with the first set of electronic data from the first computing device to the second capsule via the physical connection between the first computing device and the second capsule; and transferring the update associated with the first set of electronic data from the second capsule to the first capsule via the network connection between the first capsule and the second capsule.

13. The method of claim 11, wherein the second computing device and the first capsule are connected by a second physical connection, and wherein updating the second set of electronic data on the first and second capsules comprise:

performing an incremental copy of an update associated with the second set of electronic data from the second computing device to the first capsule via the second physical connection; and transferring the update associated with the second set of electronic data from the first capsule to the second capsule via the network connection between the first capsule and the second capsule.

14. The method of claim 9, wherein each of the first set of electronic data and the second set of electronic data comprise:
a set of personal data; and
a set of licensed data, wherein the licensed data comprises:
a set of content data; and
a set of reference data.

15. The method of claim 14, wherein the first set of electronic data and the second set of electronic data copied to the first and second capsules only comprise the set of personal data and the set of reference data.

16. The method of claim 9, wherein the first and second set of electronic data comprise:
a set of personal data having a first level of encryption;
a set of shared data having a second level of encryption; and
a set of public data.

17. The method of claim 16, wherein the first capsule and the second capsule store the first set of electronic data and the second set of electronic data maintaining the first and second level of encryption.

18. The method of claim 17, wherein:
the first level of encryption is associated with a first encryption key;
the second level of encryption is associated with a second encryption key; and the first and second encryption keys are stored on the first capsule and the second capsule as personal data.

19. A system comprising:
a processor; and
instructions stored in a non-transitory computer-readable storage medium for execution by the processor and, when executed, configured to cause the processor to perform operations comprising:

classifying a first set of electronic data stored in a first computing device as one of a set of data types;

performing an initial copy, at a first location, of the first set of electronic data from the first computing device to a first portable device when the first computing device and first portable device are in geographic proximity and physically connected;

determining that at least a portion of the first set of electronic data stored in the first computing device has changed, thereby resulting in a changed data set;

creating at least one update based on the at least a portion of the first set of electronic data that has changed; and performing an incremental copy of the first set of electronic data by transmitting via a network connection the at least one update from the first computing device to the first portable device when the first portable device is in a second location that is geographically remote from the first computing device.

20. The system of claim 19, wherein the instructions are configured to cause the processor to perform operations comprising:

partitioning the first portable device into a first portion and a second portion; and transferring a second set of electronic data to the first portable device, wherein the first set of electronic data is stored in the first portion and a second set of electronic data is stored in the second portion, the second set of electronic data transferred from a second computing device.

21. The system of claim 20, wherein the instructions are configured to cause the processor to perform operations comprising updating a copy of the second set of electronic data on the first portable device in response to changes to the second set of electronic data at the second computing device.

22. The system of claim 19, wherein the first set of device data comprises:

first data to be access controlled for storage on the first portable device;

second data to be encrypted for storage on the first portable device; and third data that initiates storage of a reference link to a content provider of the third data, wherein the third data is not stored on the first portable device.

23. The system of claim 22, wherein the instructions are configured to cause the processor to perform operations comprising storing, on the first portable device, ownership information relating to the third data.

24. The system of claim 23, wherein the ownership information is classified and stored as first data.

25. The system of claim 19, wherein performing the initial copy of the first set of electronic data to the first portable device is done via a physical connection between the first computing device and the first portable device.

26. The system of claim 25, wherein performing the incremental copy of the first set of electronic data on the first portable device is done via a wireless network connection between the first computing device and the first portable device.

27. A system comprising:
a processor; and
instructions stored in a non-transitory computer-readable operatively connected to the storage medium for execution by the processor and, when executed, configured to cause the processor to perform operations comprising:
- performing an initial copy of a first set of electronic data, which is stored in a first computing device, from the first computing device to a first capsule that is configured for storing backup copy of electronic data;
- performing an initial copy of a second set of electronic data, which is stored in a second computing device distinct from the first computing device, from the second computing device to a second capsule that is configured for storing backup copy of electronic data;
- locating the first capsule and the second capsule at a location that is geographically remote from a location of the first and second computing devices, respectively;
- transferring the first set of electronic data from the first computing device to the second capsule;
- transferring the second set of electronic data from the second computing device to the first capsule;
- updating the first set of electronic data on the first and second capsules by performing an incremental copy of the first set of electronic data on the first and second capsules; and
- updating the second set of electronic data on the first and second capsules by performing an incremental copy of the second set of electronic data on the first and second capsules.

28. The system of claim 27, wherein the incremental copy of the first set of electronic data is performed on the first capsule via a network connection between the first computing device and the first capsule, and performed on the second capsule via a physical connection between the first computing device and the second capsule.

29. The system of claim 28, wherein the first capsule and the second capsule are in network communication with one another.

30. The system of claim 29, wherein the instructions that are configured to cause the processor to perform operations comprising updating the first set of electronic data on the first and second capsules include instructions that are configured to cause the processor to perform operations comprising:
- performing an incremental copy of an update associated with the first set of electronic data from the first computing device to the second capsule via the physical connection between the first computing device and the second capsule; and
- transferring the update associated with the first set of electronic data from the second capsule to the first capsule via the network connection between the first capsule and the second capsule.

31. The system of claim 29, wherein the second computing device and the first capsule are connected by a second physical connection, and wherein the instructions that are configured to cause the processor to perform operations comprising updating the second set of electronic data on the first and second capsules include instructions that are configured to cause the processor to perform operations comprising:
- performing an incremental copy of an update associated with the second set of electronic data from the second computing device to the first capsule via the second physical connection; and
- transferring the update associated with the second set of electronic data from the first capsule to the second capsule via the network connection between the first capsule and the second capsule.

32. The system of claim 27, wherein each of the first set of electronic data and the second set of electronic data comprise:
- a set of personal data; and
- a set of licensed data, wherein the licensed data comprises:
  - a set of content data; and
  - a set of reference data.

33. The system of claim 32, wherein the first set of electronic data and the second set of electronic data copied to the first and second capsules only comprise the set of personal data and the set of reference data.

34. The system of claim 27, wherein the first and second set of electronic data comprise:
- a set of personal data having a first level of encryption;
- a set of shared data having a second level of encryption; and
- a set of public data.

35. The system of claim 34, wherein the first capsule and the second capsule store the first set of electronic data and the second set of electronic data maintaining the first and second level of encryption.

36. The system of claim 35, wherein:
- the first level of encryption is associated with a first encryption key;
- the second level of encryption is associated with a second encryption key; and
- the first and second encryption keys are stored on the first capsule and the second capsule as personal data.

* * * * *